(No Model.)
F. BERRY.
SAFETY FENDER FOR STREET CARS.
No. 574,657. Patented Jan. 5, 1897.
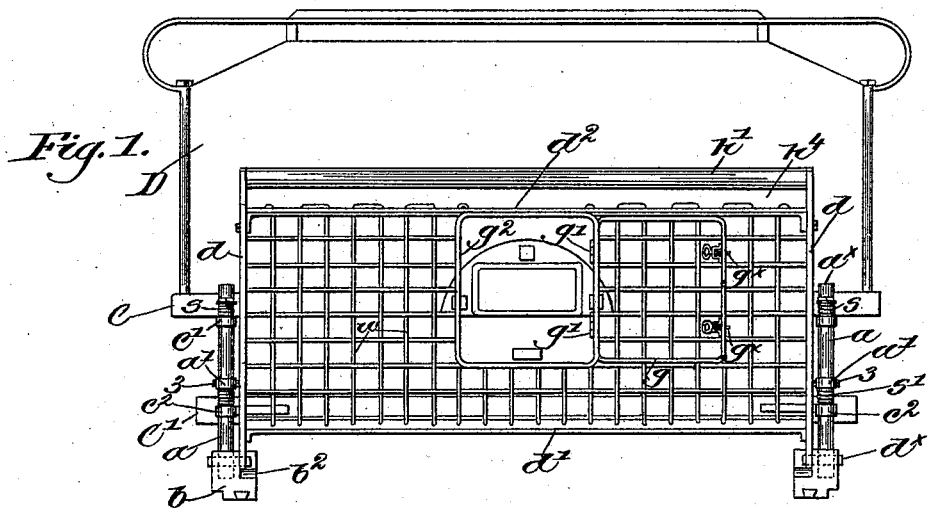
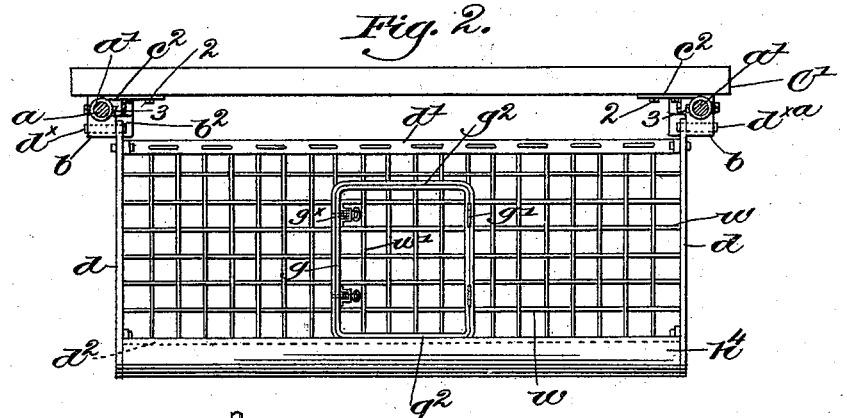
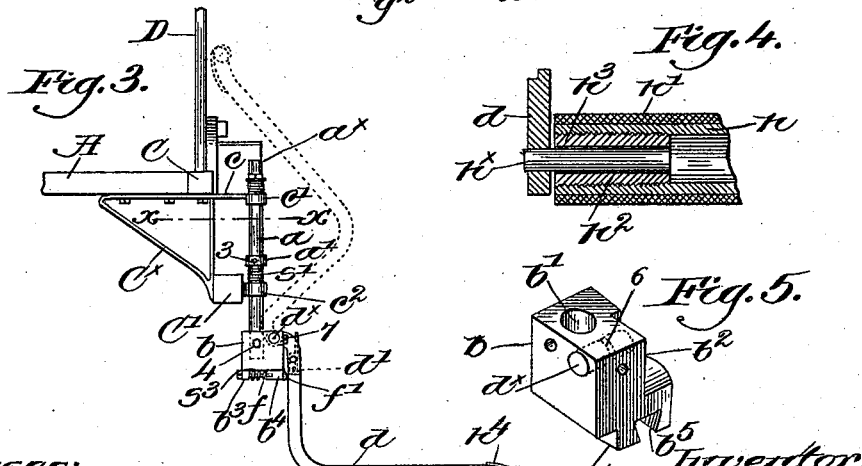
Witnesses:
Thomas F. Drummond
A. C. Harmon
Inventor:
Frank Berry
by Crosby & Gregory attys

UNITED STATES PATENT OFFICE.

FRANK BERRY, OF SWAMPSCOTT, MASSACHUSETTS.

SAFETY-FENDER FOR STREET-CARS.

SPECIFICATION forming part of Letters Patent No. 574,657, dated January 5, 1897.

Application filed March 18, 1896. Serial No. 583,723. (No model.)

*To all whom it may concern:*

Be it known that I, FRANK BERRY, of Swampscott, county of Essex, State of Massachusetts, have invented an Improvement in Safety-Fenders for Street-Cars, of which the following description, in connection with the accompanying drawings, is a specification, like letters and numerals on the drawings representing like parts.

This invention has for its object the production of a safety-fender for street-cars which is adapted to catch and protect from injury any person who may be struck by the car, the fender being strong, durable, and simple in construction.

Figure 1 is a front view of the platform of a street-car with my invention applied thereto, the fender being shown as upturned against the dasher. Fig. 2 is a top or plan view of the fender in operative position, taken below the line $x\ x$, Fig. 3, the main portion of the car being omitted. Fig. 3 in side elevation shows the fender in operative position with the mode of attachment to the car. Fig. 4 is a sectional detail of the roll and one of its supports, and Fig. 5 is a perspective view of one of the carrier-blocks to be described.

The platform A, upper and lower cross-bars C C', and the dashboard D are and may be as usual in street-cars, the body of the car and the wheels being omitted as having no connection with my invention, the cross-bar C' being shown as supported by brackets $C^\times$, Fig. 3.

The brackets are shown as provided with forward extensions $c$, having sleeve-bearings $c'$, while the lower cross-bar C' has secured thereto, as by bolts 2, sleeve-bearings $c^2$, below and in alinement with the bearings $c'$.

Slide-rods $a$ are extended through the bearings, one on each side of the car-front, and threaded at their upper ends (see dotted lines, Fig. 3) to receive nuts $a^\times$ thereon, between which and the top of the bearing $c'$ a spring $s$ is interposed surrounding each rod $a$.

A collar $a'$ on each of the rods, held adjustably thereon by a set-screw 3 above the adjacent bearing $c^2$, rests upon a spring $s'$, surrounding the slide-rod and supported by the said bearing, so that the slide-rods are yieldingly supported and free to move vertically in their bearings.

To the lower end of each rod $a$ is secured a carrier-block $b$, having a socket $b'$ therein (see Fig. 5) to receive the rod, which is held thereon by a suitable set-screw 4, each block being also recessed at $b^2$ on its inner face and provided at its under side with lugs $b^3\ b^4$, the latter having a preferably dovetailed or undercut groove $b^5$ therein.

The frame comprises substantially L-shaped side bars $d$, an upper cross-girt $d'$, and a lower cross-girt $d^2$, the latter being secured to the side bars $d$, near the outer lower ends thereof, the side bars and cross-girts being preferably provided with holes through which are strung stout wires $w$, forming a flexible though strong covering for the frame.

Studs $d^\times$ are passed through the upper ends of the side bars $d$ and enter suitable bearings in the carrier-blocks $b$, said studs having each an annular groove 6 to receive a set-screw 7, held in the carrier-block, to prevent removal of the studs, which form pivotal supports for the fender proper.

The recesses $b^2$ receive the upper ends of the side bars $d$ and permit the latter to be swung about their pivots $d^\times$, as shown by dotted lines, Fig. 3, when the fender is turned up into inoperative position.

I prefer to extend the wire $w$ up beyond the cross-girt $d'$ in the form of loops $w'$ to form a guard in front of the space between the said cross-girt and the axis of the fender-frame.

A bolt $f$, extended loosely through the ear $b^3$ of each carrier-block $b$, is headed at $f'$ to enter and slide in the groove $b^5$ of the ear $b^4$, and is normally extended, as shown in Fig. 3, by a spring $s^2$ between the head $f'$ and the ear $b^3$, the outer ends of the two heads bearing against the rear sides of the side bars $d$ of the fender-frame to retain the latter above and out of contact with the track T.

An iron pipe $h$ (see Fig. 4) is covered with rubber or some other suitable material $h'$, the pipe $h$ being interiorly threaded at each end at $h^2$ to receive therein threaded bushings $h^3$, in which enter journal-studs $h^\times$, fast in the preferably down-curved extremities of the side bars $d$.

Above the roll and acting as an apron or shield therefor is secured a curved piece of sheet metal $h^4$, the roll resting upon the track when the weight of a person upon the fender depresses it, or lifting the outer edge of the fender over small obstacles, such as stones.

In order to permit one car to be coupled to another without the use of chains, draw-bars, or the like; I provide the fender with a gate $g$, shown as hinged at $g'$ to a frame $g^2$, which is bolted along one side to the lower cross-girt $d^2$, the wires $w$ being secured to said frame, while the gate itself is filled in with interlaced wire $w^\times$.

The hinges $g'$ are preferably spring-controlled and of any suitable construction, the normal tendency thereof being to open the gate in the position shown in Fig. 1.

One or more spring bolts or latches $g^\times$ on the gate are adapted to enter holes in the side of the frame $g^2$ to normally hold the gate closed, as shown in Fig. 2.

By releasing the latches $g^\times$ and opening the gate $g$ the bumper B of the car is exposed, and when the fender is upturned on its pivots $d^\times$, as shown by dotted lines, Fig. 3, the bumper can project therethrough, or a link connecting the car to another can be used.

Having fully described my invention, what I claim, and desire to secure by Letters Patent, is—

1. A safety-fender for street-cars, comprising a swinging frame, carriers to which said frame is pivoted at its inner end, vertically-movable yieldingly-supported slide-rods to which the carriers are secured, spring-controlled bolts movable in the carriers and adapted to act upon said frame and maintain it above the track, and means to adjust the position of the said bolts to regulate the normal position of the frame, substantially as described.

2. In a safety-fender for street-cars, vertically-movable spring-controlled supports, means to adjust said supports vertically, carriers secured to said supports and recessed at their inner sides, a fender-frame pivoted to the carriers and adapted to be swung up into inoperative position in the recesses of the carriers, and a gate in said frame, whereby when the frame is swung up and the gate opened the car-bumper is exposed, substantially as described.

3. In a safety-fender for street-cars, vertical supports, carriers secured to the lower ends thereof and recessed at their inner sides, a fender-frame having substantially L-shaped side bars, pivots connecting the upper ends of the bars to the carriers, the said bars being adapted to be swung in the recesses of the carriers, a roll on the outer end of the frame, and means to retain the frame extended above the track when in operative position, substantially as described.

4. A fender for street-cars having side bars downturned at their outer ends and provided with inturned journal-studs, a roll having a yielding covering, a bushing threaded into each end of the roll, to receive the studs and rotatably support the roll, and a shield secured to the downturned ends of the side bars and extended over the roll, substantially as described.

5. A fender for street-cars having side bars inturned journal-studs at the outer ends thereof, a metallic roll having a yielding covering, and a bushing threaded into each end of the tube, said studs extending into the bushings to rotatably support the roll, substantially as described.

In testimony whereof I have signed my name to this specification in the presence of two subscribing witnesses.

FRANK BERRY.

Witnesses:
AUGUSTA E. DEAN,
JOHN C. EDWARDS.